US012759129B2

(12) United States Patent
Davis et al.

(10) Patent No.: US 12,759,129 B2
(45) Date of Patent: Oct. 13, 2026

(54) SYSTEMS AND METHODS FOR WIRELESS COMMUNICATION WITH A STORED POWER TOOL

(71) Applicant: Milwaukee Electric Tool Corporation, Brookfield, WI (US)

(72) Inventors: Anthony M. Davis, Brookfield, WI (US); Jeremy R. Ebner, East Troy, WI (US); Jonathan Abbott, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 204 days.

(21) Appl. No.: 18/690,148

(22) PCT Filed: Sep. 9, 2022

(86) PCT No.: PCT/US2022/043117
§ 371 (c)(1),
(2) Date: Mar. 7, 2024

(87) PCT Pub. No.: WO2023/039198
PCT Pub. Date: Mar. 16, 2023

(65) Prior Publication Data

US 2025/0001575 A1 Jan. 2, 2025

Related U.S. Application Data

(60) Provisional application No. 63/242,734, filed on Sep. 10, 2021.

(51) Int. Cl.
*B25F 5/02* (2006.01)
*H04B 5/26* (2024.01)

(52) U.S. Cl.
CPC ............ *B25F 5/029* (2013.01); *H04B 5/263* (2024.01); *H04B 5/266* (2024.01)

(58) Field of Classification Search
CPC ......... B25F 5/029; H04B 5/263; H04B 5/266; H02J 7/42

(Continued)

(56) References Cited

U.S. PATENT DOCUMENTS

2011/0295270 A1 12/2011 Giordano et al.
2012/0326406 A1* 12/2012 Lifshitz .................... B25H 3/02 206/503

(Continued)

FOREIGN PATENT DOCUMENTS

AU 2019246880 A1 10/2019

*Primary Examiner* — Juan A Torres
(74) *Attorney, Agent, or Firm* — Quarles & Brady LLP

(57) ABSTRACT

A system and method for wirelessly communicating with a stored power tool is provided. In some embodiments, a system comprises a power source interface configured to selectively electrically couple to a power source; a transceiver; an antenna; a processor electrically coupled to the power source, the transceiver, and the antenna, wherein the processor is configured to: establish a first communication link with an external device; receive an indication that communications with the power tool are to be carried out; and in response to the indication that communications with the power tool are to be carried out, establish a wireless second communication link with the power tool using the transceiver and antenna.

24 Claims, 9 Drawing Sheets

(58) Field of Classification Search
USPC .......................................... 455/39; 340/286.01
See application file for complete search history.

(56) References Cited

U.S. PATENT DOCUMENTS

| | | | | |
|---|---|---|---|---|
| 2014/0166516 | A1* | 6/2014 | Martinez .................. | B25H 3/02<br>206/372 |
| 2016/0226278 | A1* | 8/2016 | Wenger ..................... | B25F 5/00 |
| 2019/0030705 | A1* | 1/2019 | Hoppe ................. | A45C 13/262 |
| 2019/0043292 | A1* | 2/2019 | Hoossainy ......... | G07C 9/00309 |
| 2019/0225371 | A1* | 7/2019 | Hoppe ................... | B25H 3/027 |
| 2020/0147771 | A1* | 5/2020 | Mergener ............ | B25B 23/1475 |
| 2020/0284425 | A1* | 9/2020 | Plato ................... | F21V 33/0084 |
| 2021/0266718 | A1* | 8/2021 | Vetter ....................... | B25F 5/02 |

* cited by examiner

SYSTEMS AND METHODS FOR WIRELESS COMMUNICATION WITH A STORED POWER TOOL

RELATED APPLICATIONS

The present application represents the national stage entry of PCT/US2022/043117 filed Sep. 9, 2022 and is based on and claims priority from U.S. Patent Application No. 63/242,734, filed on Sep. 10, 2021, the entire disclosure of each of which is incorporated herein by reference.

BACKGROUND

Handheld battery-powered tools, such as drills, cutting tools, sanders, etc., can provide flexibility and convenience for operators. For example, a battery-powered tool can be moved around a job site without extension cords.

SUMMARY

In accordance with some embodiments of the disclosed subject matter, a system for wirelessly communicating with a stored tool is provided, the system comprising: a power source interface configured to selectively electrically couple to a power source; a transceiver; an antenna; a processor electrically coupled to the power source, the transceiver, and the antenna, wherein the processor is configured to: establish a first communication link with an external device; receive an indication that communications with the tool are to be carried out; and in response to the indication that communications with the power tool are to be carried out, establish a wireless second communication link with the power tool using the transceiver and antenna.

In accordance with some embodiments of the disclosed subject matter, a method for wirelessly communicating with a stored tool is provided, the method comprising: establishing a first communication link with an external device; receiving an indication that communications with the tool are to be carried out; and in response to the indication that communications with the tool are to be carried out, establishing a wireless second communication link with the tool using a transceiver and antenna.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

As described above, battery-powered tools can provide flexibility and convenience. For example, an operator can carry the tool from one area to another without finding a new outlet to use, or moving an extension cord. Additionally, such battery-powered tools can be operated when wall power is not available.

Increased computing capabilities can be incorporated into devices, such as power tools, that can facilitate additional functionality. For example, a communication system can be incorporated into (and/or interfaced with) a power tool, which can facilitate communication with a power tool (e.g., to retrieve tool operation data). As another example, a communication system can facilitate updating and/or changing parameters and/or modes of a power tool. As yet another example, a communication system can facilitate tracking and/or locating the device (e.g., via a beacon functionality). As still another example, a communication system can facilitate security features, such as locking the power tool to inhibit or enable its use during certain periods of time. However, such additional functionality generally requires a power source to power the communication system and/or controller of the power tool to implement such functions. If the communication system is out of communication range (e.g., about 4 centimeters for near-field communication systems), such additional features may be unusable. Additionally, if a main battery is removed from a battery-powered tool, or the main battery lacks power (e.g., the battery lacks sufficient charge), such additional features may be unusable.

As described below, a power tool can include a communication system that can be powered externally (e.g., via inductive coupling) when power is not available from a main power source, which can facilitate certain additional functionality, such as location and/or tracking when main power is not available. However, such a communication system may have a relatively short range (e.g., on the order of several centimeters), and may not be in range of a computing device (e.g., a smartphone, a tablet computer, a laptop computer) when the tool is stored (e.g., in a toolbox). Providing a longer-range communication system (e.g., Bluetooth or Wi-Fi, having a range of at least meters) can require an alternate power source (e.g., a coin cell battery) when the main power source is not capable of providing power, and such a communication system can be more costly than a relatively simple shorter range communication system (e.g., an NFC communication system).

In accordance with some embodiments of the disclosed subject matter, mechanisms described herein can provide solutions to these problems by providing improved systems and methods for wireless communication with a stored power tool.

Figure 1:
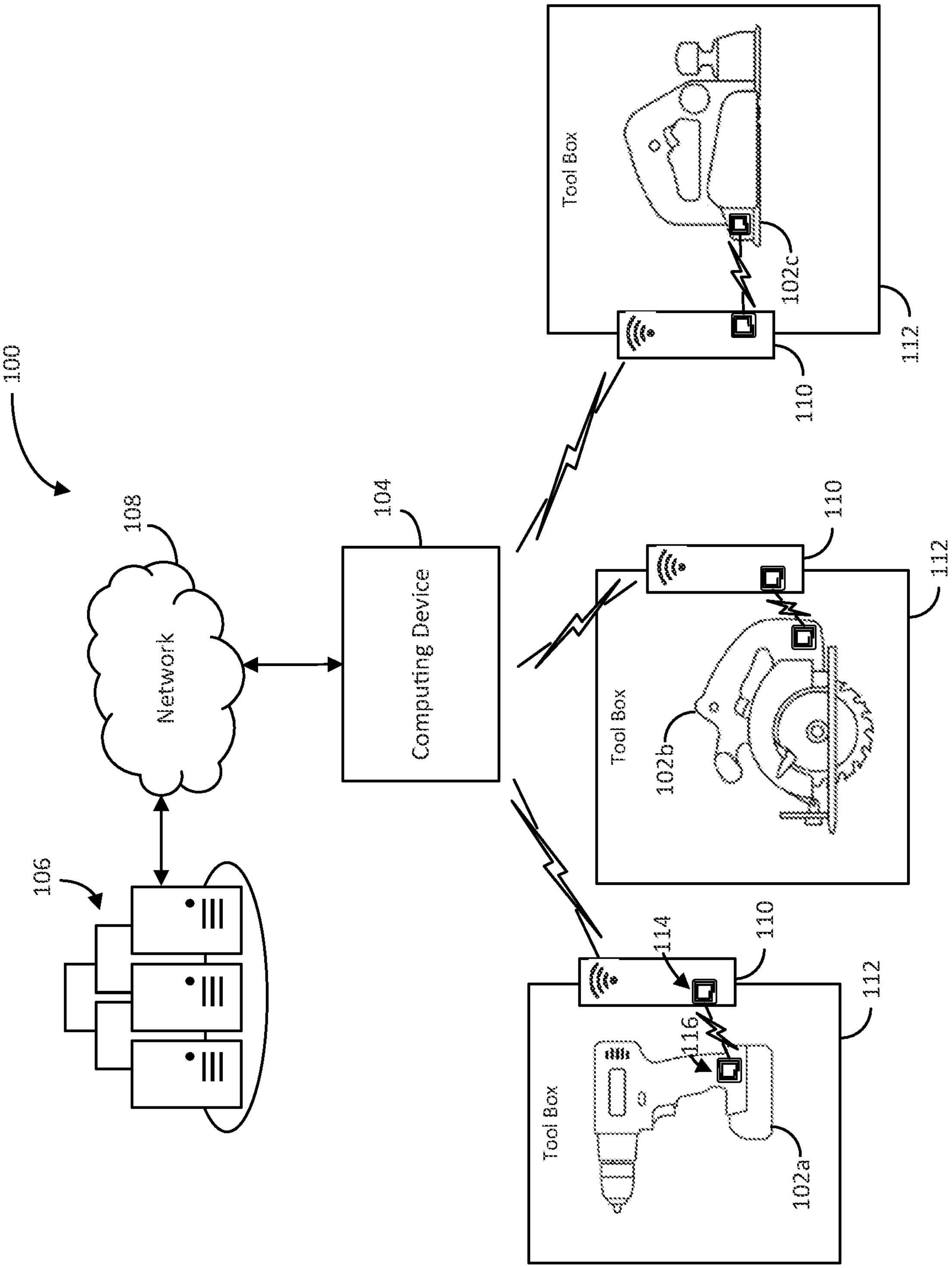
FIG. 1 is a schematic illustration of a system for wireless communication with a stored power tool in accordance with some embodiments of the disclosed subject matter.

FIG. 1 is a schematic illustration of a system 100 in accordance with some embodiments of the disclosed subject matter. As shown in FIG. 1, system 100 can include various power tool devices 102*a*, 102*b*, and 102*c*, a computing device 104 (sometimes referred to herein as an external device), and one or more remote computing devices 106 (e.g., servers). The power tool devices 102*a*, 102*b*, and 102*c* may each be referred to as a power tool device 102 (or power tool 102), and may be collectively referred to as power tool devices 102 (or power tools 102). The power tools 102 may each be a motorized power tool or a non-motorized power tool. In some embodiments, each motorized power tool can include a moveable component (e.g., drill bit, driver bit, saw blade, crimper head, cutter head, etc.) and an actuator that can move (e.g., translate, rotate, etc.) the moveable component to implement a functionally on a workpiece. For example, a motorized power tool can be a drill, an impact driver, a crimper, a cutter, etc. In some embodiments, a non-motorized power tool can lack an actuator, a moveable component, etc., and thus can lack the ability to implement a functionality on a workpiece. For example, a non-motorized power tool can be a radio, a speaker, a work light, a power supply (e.g., a portable power supply), a power tool battery pack charger, a laser (e.g., used to provide alignment, leveling, squaring, etc.), a power tool battery pack configured to removably attach to and power a power tool, etc. Note that power tools are described herein as examples, and mechanisms described herein can be used in connection with other tools, devices, and/or objects. For example, in some embodiments, mechanisms described herein can be used to communicate with a hand tool, such as a hammer, wrench, or the like (e.g., that has a communication device coupled thereto or integrated therein), or other hand-held communication devices (e.g., a mobile communication device (e.g., a mobile phone, a tablet computer, etc.)). As used herein, the term tool may refer to a power tool (whether motorized or non-motorized) or a hand tool as described above.

Figure 6B:
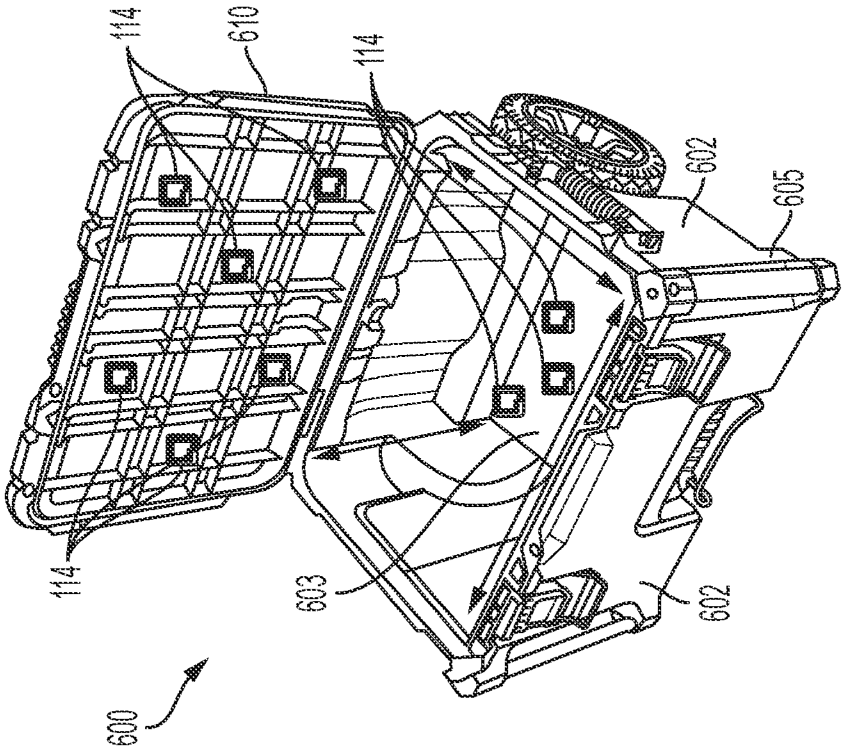
FIGS. 6A-B illustrate a tool box for storing and wirelessly communicating with a stored power tool in accordance with some embodiments of the disclosed subject matter.
Figure 6A:
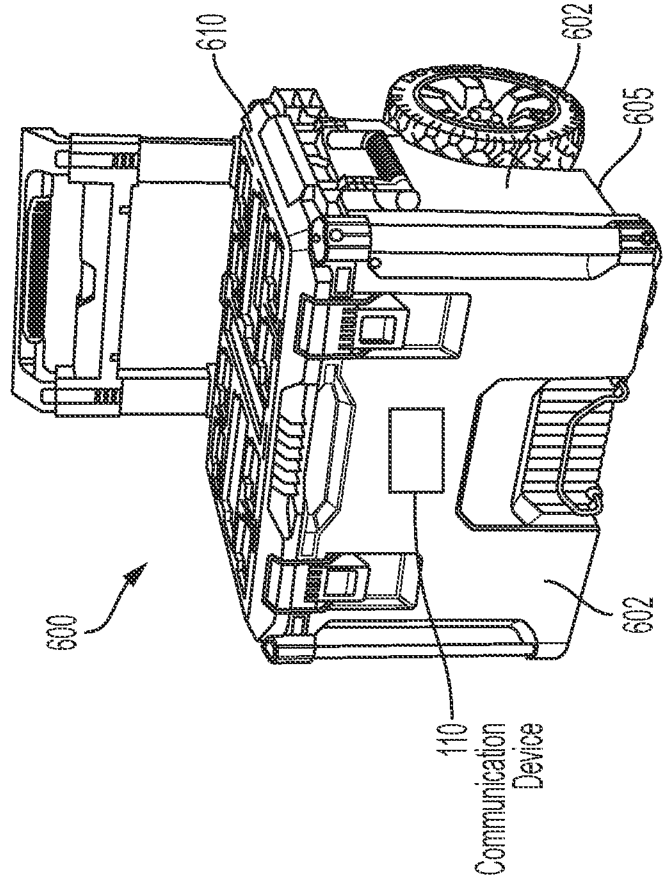

In some embodiments, a tool box 112 can be configured to store one or more power tools 102. For example, tool box 112 can include a housing (e.g., including a lid, including a top and bottom, etc.) into which a power tool 102 can be placed. Tool box 600 of FIGS. 6A and 6B is an example of a tool box 112, although the tool box 112 may come in various sizes and shapes. For example, tool box 112 may be single- or multi-drawer tool chest, may include multiple tool boxes configured to be attached to one another (see, e.g., PACKOUT modular storage system offered by Milwaukee Tool), or another storage device defining a volume (whether box-shaped or another shape) for storing one or more tools.

In some embodiments, a communication device 110 can be associated with tool box 112, and can be configured to wirelessly communicate with one or more power tools disposed within tool box 112. For example, in some embodiments, communication device 110 can wirelessly communicate with one or more power tools 102 using any suitable wireless communication technique or combination of techniques (e.g., as described below in connection with FIGS. 2A. 2B, 3A, and 3B). In some embodiments, communication device 110 can communicate any suitable information and/or instructions to a particular power tool, such as instructions to provide data stored by the power tool, information used to update one or more settings and/or parameters of the power tool, instructions to adjust one or more parameters (e.g., operational parameters, safety parameters, tool mode, etc.), instructions to alter a security setting of the power tool, etc. In some embodiments, power tool 102 can communicate any suitable information and/or instructions to communication device 110, such as status information (e.g., including a security status), operation data (e.g., operation statistics), identification information associated with the power tool, power tool usage information, power tool maintenance data, etc. As described below in connection with FIGS. 2A to 5, in some embodiments, power tool 102 can be inhibited from communicating certain types of information and/or performing certain types of actions when a main power source (e.g., a battery pack) is not providing sufficient power to the power tool (e.g., because the main power source is not connected, because the main power source is depleted, etc.).

Tool box 112 is an example of a tool storage system. In some examples of system 100, one or more of wireless communication devices 110 may be associated with another type of tool storage system, such as a rack or hanging system having brackets, hooks, or other hangers configured to support a suspended or hanging tool.

In some embodiments, communication device 110 can wirelessly communicate with one or more computing devices 104 and/or servers 106 using any suitable wireless communication technique or combination of techniques (e.g., as described below in connection with FIGS. 3A and 3B). For example, in some embodiments, communication device 110 can include an antenna 114 (e.g., a coil antenna), and power tool 102 can include an antenna 116. In such an example, communication device 110 can establish a wireless communication link with power tool 102 via antennas 114 and 116 using any suitable wireless communication protocol (e.g., near-field communication). In some embodiments, antenna 116 can be disposed at any suitable location on power tool 102, such as on a handle, near a base of power tool 102 (e.g., near a battery pack interface), on a surface of power tool 102 covered by a battery pack when the battery pack is connected, on a side of power tool 102, on a top of power tool 102, etc. For example, antenna 116 can be disposed in a location such that power tool 102 can be hung (e.g., from a rack) using a suitable portion of power tool 102 (e.g., rails associated with a battery pack interface, a base that is wider than a handle, etc.), and antenna 114 can be disposed in connection with the rack such that when power tool 102 is hung from the rack, antenna 116 is brought into proximity to antenna 114.

In some embodiments, communication device 110 and computing device 104 and/or server 106 can communicate any suitable information and/or instructions. For example, computing device 104 and/or server 106 can communicate any suitable information and/or instructions to a particular power tool via an associated communication device 110. As another example, communication device 110 can communicate any suitable information and/or instructions received from a power tool to computing device 104 and/or server 106.

In some embodiments, communication device 110 and/or computing device 104 can communicate with server 106 over a communication network 108. For example, communication device 110 and/or computing device 104 can communicate information to server 106 and/or receive information from server 106. In a more particular example, communication device 110 and/or computing device 104 can communicate status information (e.g., a location status, a security status, etc.) associated with a particular power tool 102, operation data (e.g., operation statistics) associated with a particular power tool 102, identification information associated with a particular power tool 102, power tool usage information associated with a particular power tool 102, power tool maintenance data associated with a particular power tool 102, etc. As another example, server 106 can provide information that can facilitate additionally functionality and/or services associated with power tool 102 (e.g., enabling one or more features and/or services), can provide updated software (e.g., an updated application to computing device 104, updated software and/or firmware for communication device 110, updated software and/or firmware for power tool 102, etc.), and/or any other suitable functions.

In some embodiments, communication device 110 can have any suitable form factor. For example, in some embodiments, one or more antennas used to communicate with one or more power tools 102 can be incorporated into tool box 112. In such an example, the one or more antennas can be affixed and/or incorporated into a surface (e.g., an interior surface, an exterior surface) of tool box 112. As another example, the one or more antennas used to communicate with one or more power tools 102 can be incorporated into a mat (e.g., a plastic mat, a rubber mat), which can be disposed within, and/or affixed to, tool box 112. In some embodiments, providing multiple antennas can increase coverage of an interior of tool box 112, such that power tools that are implemented with a suitable antenna can be disposed within tool box 112 in a variety of locations, while being within range of at least one of the antennas. In some embodiments, the antennas may be arranged in the tool box 112 in a grid pattern or another pattern.

In some embodiments, computing device 104 and/or server 106 can be any suitable computing device or combination of devices, such as a desktop computer, a laptop computer, a smartphone, a tablet computer, a wearable computer, a server computer, a virtual machine being executed by a physical computing device, etc.

In some embodiments, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 108 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

Figure 2A:
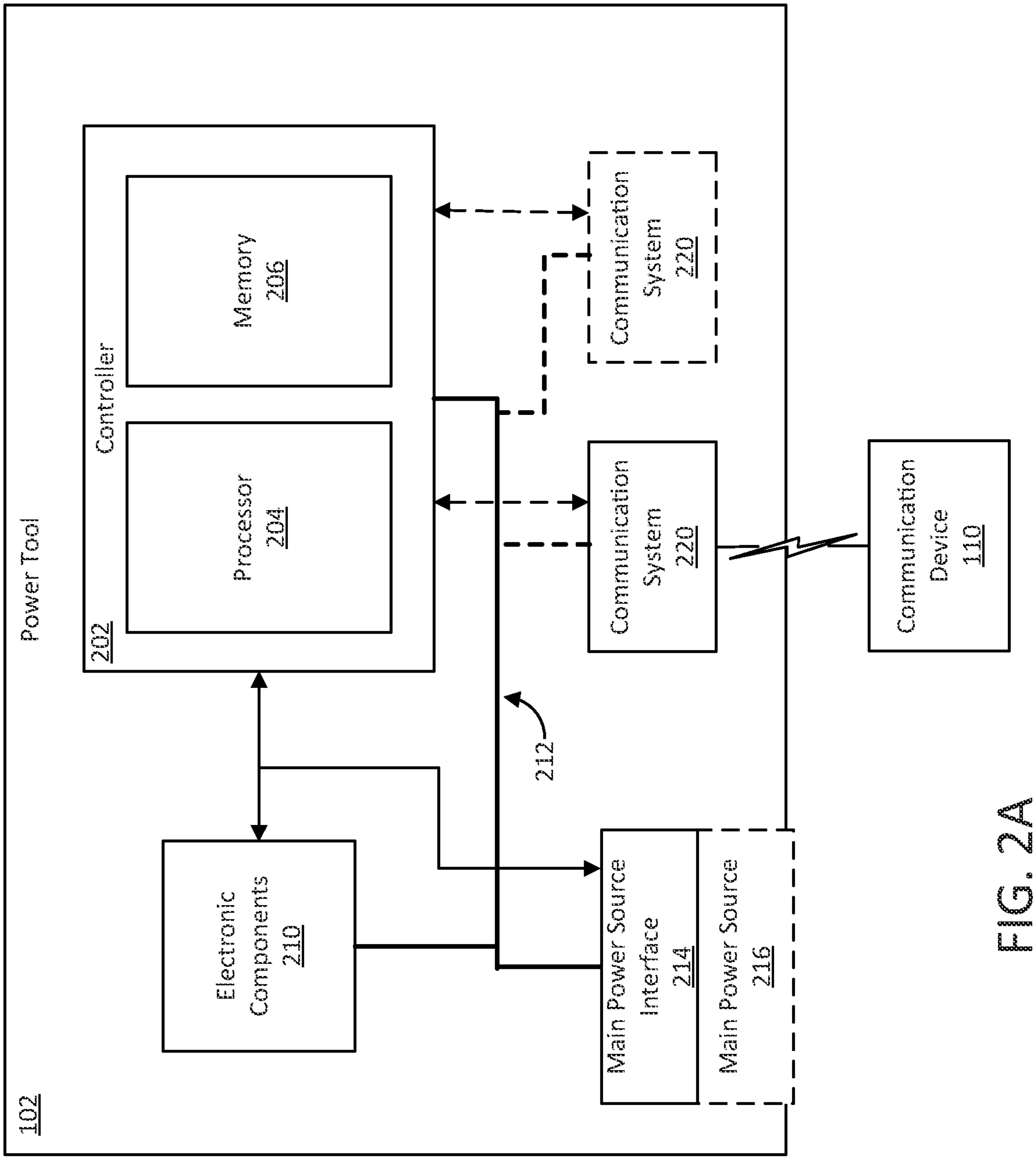
FIG. 2A is a schematic illustration of a tool implemented with a wireless communication system in accordance with some embodiments of the disclosed subject matter.

FIG. 2A is a schematic illustration of a power tool 102 implemented with a wireless communication system in accordance with some embodiments of the disclosed subject matter. As shown in FIG. 2A, power tool 102 can include a controller 202, which can include a processor 204 and memory 206, electronic components 210, a power line 212, a main power source interface 214, a main power source 216, and a communication system(s) 220.

In some embodiments, controller 202 can be a microcontroller, a system on a chip (SOC), a printed circuit board including at least a processor and memory, etc. In some embodiments, processor 204 can be any suitable hardware processor or combination of processors, such as a central processing unit (CPU), a graphics processing unit (GPU), an application specific integrated circuit (ASIC), a field programmable gate array (FPGA), etc.

In some embodiments, memory 206 can include any suitable storage device or devices that can be used to store instructions, values, etc., that can be used, for example, by processor 204 to control components of power tool 102, to communicate with one or more communication devices 110 and/or computing devices 104, etc. Memory 206 can include any suitable volatile memory, non-volatile memory, storage, or any suitable combination thereof. For example, memory 206 can include random access memory (RAM), read-only memory (ROM), electrically erasable programmable read-only memory (EEPROM), one or more flash drives, etc. In some embodiments, memory 206 can have encoded thereon a program for controlling operation of controller 202 and/or power tool 102. In such embodiments, processor 204 can execute at least a portion of the program to establish a wireless communication link with a computing device (e.g., communication device 110, computing device 104), provide power to and/or control electronic components 210, receive information and/or instructions from computing device 104 and/or server 106 (e.g., via communication device 110), transmit information to computing device 104 and/or server 106 (e.g., via communication device 110), change one or more settings and/or parameters associated with power tool 102, etc.

In some embodiments, electronic components 210 can include any suitable components, such as one or more switches (e.g., for initiating and ceasing operation of the tool), one or more sensors, one or more motors, one or more indicators, etc. For example, in a motorized power tool (e.g., drill-driver, saw, etc.), electronic components 210 can include, for example, an inverter bridge, a motor (e.g., brushed or brushless) for driving a tool implement, etc. For a non-motorized power tool (e.g., a work light, a work radio, ruggedized tracking device, etc.), the electronic components 210 can include, for example, one or more of a lighting element (e.g., an LED), an audio element (e.g., a speaker), a power source, etc. In some embodiments, controller 202 can be configured to control one or more of electronic components 210. For example, in instances where electronic components 210 include a motor and a sensor for sensing actuation of a trigger of power tool 102, controller 202 can be configured to control an inverter bridge or otherwise control driving of the motor based on sensed actuation of the trigger.

In some embodiments, main power source interface 214 can be configured to selectively receive main power source 216. For example, main power source interface 214 can mechanically receive and/or couple main power source 216 to secure main power source 216 to power tool 102. In some embodiments, main power source interface 214 can also electrically couple main power source 216 to one or more components of power tool 102 (e.g., controller 202, electronic components 210, etc.) to provide power and/or communications between main power source 216 and one or more other components of power tool 102. In some embodiments, power can be provided from main power source 216 via power line 212 (e.g., a wire(s), multiple wires, a bus, a trace, etc.). In some embodiments, main power source interface 214 can include, and/or be associated with, any suitable components configured to regulate and/or control power received from main power source 216 and provided to other components of power tool 102.

In some embodiments, main power source 216 can be a power tool battery pack. A power tool battery pack can include one or more battery cells of various chemistries, such as lithium-ion (Li-Ion), nickel cadmium (Ni-Cad), etc. A power tool battery pack can further selectively latch and unlatch (e.g., with a spring-biased latching mechanism) to power tool 102 (e.g., via main power source interface 214) to prevent unintentional detachment. A power tool battery pack (e.g., main power source 216) can include a pack electronic controller (pack controller) including a processor and memory. For example, such a pack controller can be configured similarly to controller 202 of power tool 102. The pack controller can be configured to regulate charging and discharging of the battery cells, and/or to communicate with controller 202. In some embodiments, main power source 216 can further include, for example, a charge level fuel gauge, analog front ends, sensors, etc.

In some embodiments, communication system(s) 220 can include any suitable hardware, firmware, and/or software for communicating information over communication network 108 and/or any other suitable communication networks. For example, communication system(s) 220 can include one or more transceivers, one or more communication chips and/or chip sets, one or more antennas (e.g., disposed in different locations, facilitating different communication protocols, etc.), etc. In a more particular example, communication systems 220 can include hardware, firmware and/or software that can be used to establish a Wi-Fi connection, a Bluetooth connection (e.g., which may be a Bluetooth low energy connection), a near field communication (NFC) connection, a radio frequency identification (RFID) connection, a cellular connection, an Ethernet connection, an ultra wideband (UWB) connection, a Zigbee connection, a Z-wave connection, a light-based connection (e.g., Li-Fi, IrDA, etc.), a sound-based connection (e.g., an ultrasonic connection, such as ChirpCast, NearBytes, etc.), etc. In some embodiments, power tool 102 can include multiple communication devices 220, which can, for example, be disposed in multiple locations, which can provide redundancy and/or provide additional locations at which communication can be established. In some embodiments, connections between communication system 220 and controller 202 and/or main power source interface 214 can be omitted (e.g., communication system 220 can be used to determine a location of power tool 102, for example, via a connection established by communication device 110).

Figure 2B:
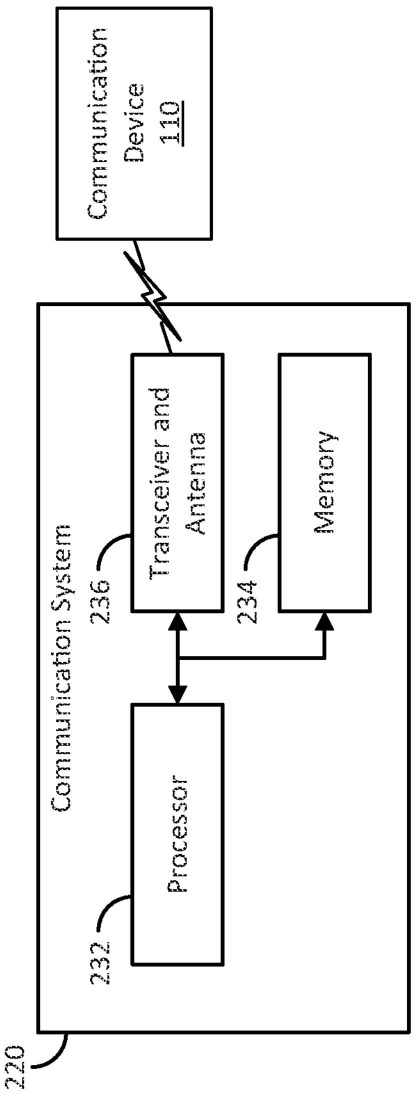
FIG. 2B is a schematic illustration of a wireless communication system in accordance with some embodiments of the disclosed subject matter.

FIG. 2B is a schematic illustration of wireless communication system 220 in accordance with some embodiments of the disclosed subject matter. In some embodiments, communication system 220 can include a processor 232, memory 234, and a transceiver and associated antenna 236. In some embodiments, processor 232 can be any suitable hardware processor or combination of processors, such as a CPU, a GPU, an ASIC, an FPGA, etc.

In some embodiments, memory 234 can include any suitable storage device or devices that can be used to store instructions, values, etc., that can be used, for example, by processor 232 to control operation of communication system 220, to communicate with one or more devices (e.g., communication device 110, computing device 104) and/or components of power tool 102 (e.g., controller 202, etc.), etc. Memory 234 can include any suitable volatile memory, non-volatile memory, storage, or any suitable combination thereof. For example, memory 234 can include RAM, ROM, EEPROM, one or more flash drives, etc. In some embodiments, memory 234 can have encoded thereon a program for controlling operation of communication system 220. In such embodiments, processor 232 can execute at least a portion of the program to establish a wireless communication link with a computing device (e.g., communication device 110, computing device 104), receive data and/or instructions (e.g., from communication device 110, from computing device 104, from server 106), provide data to controller 202, receive data from controller 202, store data (e.g., tool operation data) using memory 234 for later transmission (e.g., when power tool 102 is stored and/or lacks power from main power source 216), transmit data to a computing device (e.g., communication device 110, computing device 104), etc. In some embodiments, while controller 202 is powered by main power source 216, controller 202 can periodically store tool operation data in memory 234. For example, controller 202 can store tool operation data in memory 234 every 20 minutes, 30 minutes, after each actuation or operation of the power tool 102, etc.

In some embodiments, transceiver and antenna 236 can include a transceiver and antenna configured to transmit and/or receive data using any suitable communication protocol(s). For example, transceiver and antenna 236 can include a transceiver and antenna configured to communicate using protocols associated with NFC. As another example, transceiver and antenna 236 can include a transceiver and antenna configured to communicate using protocols associated with RFID connection. As yet another example, transceiver and antenna 236 can include a transmitter, receiver, and/or antenna configured to communicate using any other suitable technology or combination of technologies, (UWB connection, Zigbee, Z-wave, a light-based connection, a sound-based connection, NearBytes, etc.). In some embodiments, communication system 220 can communicate using multiple different protocols and/or technologies. Additionally, in some embodiments, the communication system 220 may include multiple communication systems that each may communicate using different communication protocols and/or technologies. For example, one communication system (e.g., configured to communicate via Bluetooth) can be used when main power source 216 is capable of providing power, and another communication system (e.g., configured to communicate via NFC) when main power source 216 is not capable of providing power.

In some embodiments, transceiver and antenna 236 can be configured to receive power from an external device (e.g., communication device 110, computing device 104) that can be used to provide power to processor 232 and/or memory 234, and can be used to receive and/or transmit data. For example, transceiver and antenna 236 can receive power via inductive coupling with a transmitting antenna associated with the external device. In some embodiments, power received from an external device via transceiver and antenna 236 can be provided to one or more other components of power tool 102. For example, power received from an external device via transceiver and antenna 236 can be provided to controller 202 (e.g., to facilitate communication between controller 202 and the external device), main power source 216 (e.g., to charge main power source 216), an alternate power source (e.g., to charge a rechargeable coin cell), etc. In a more particular example, communication system 220 can be incorporated into a battery pack and/or a device that includes one or more batteries and/or interfaces configured to selectively couple to a battery or batteries, and power received via transceiver and antenna 236 can be used to charge one or more of the batteries.

Figure 3A:
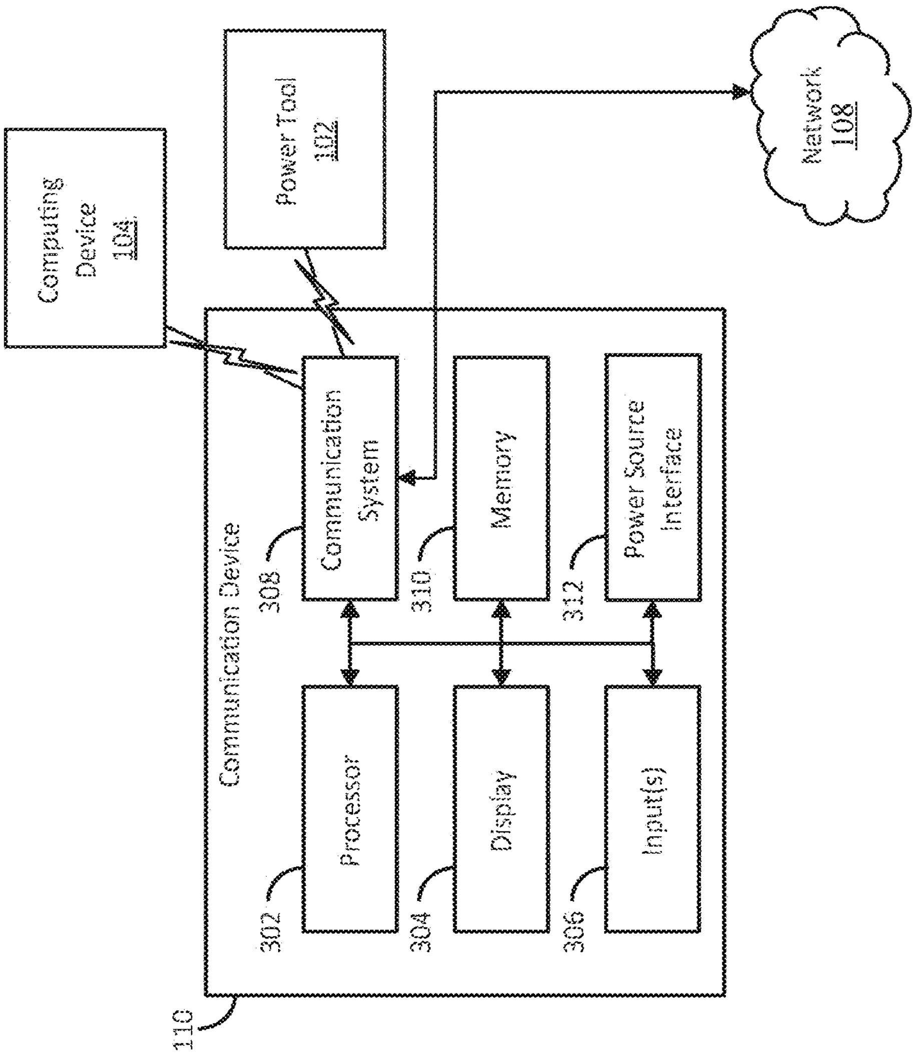
FIG. 3A is a schematic illustration of a communication device implemented with a wireless communication system in accordance with some embodiments of the disclosed subject matter.

FIG. 3A is a schematic illustration of communication device 110 implemented with a wireless communication system in accordance with some embodiments of the disclosed subject matter. The communication device 110 may also be referred to as a tool box communication device or a tool storage communication device because the communication device may be integrated with a tool box or other tool storage system (e.g., tool rack for hanging or otherwise supporting tools). As shown in FIG. 3A, in some embodiments, communication device 110 can include a processor 302, a display 304, one or more inputs 306, one or more communication systems 308, memory 310, and/or a power source interface 312. In some embodiments, processor 302 can be any suitable hardware processor or combination of processors, such as a CPU, a GPU, an ASIC, an FPGA, etc. In some embodiments, display 304 can include any suitable display devices, such as a computer monitor, a touchscreen, a television, etc. In some embodiments, inputs 306 can include any suitable input devices and/or sensors that can be used to receive user input, such as one or more buttons, a touchscreen, a microphone, etc. In some embodiments, display 304 and/or inputs 306 can be omitted. For example, in some embodiments, communication device 110 can be implemented without user-manipulatable physical components configured to facilitate user input and/or output (e.g., input and/or output can instead be provided via a paired computing device, such as a smartphone, laptop, etc.). In some embodiments, a location of an antenna(s) or other transmission/receiving devices associated with communication device 110 can be marked using any suitable technique or combination of techniques. For example, a location of an antenna can be marked using a passive visual marker (e.g., using paint, differently colored material, texture in a surface). As another example, a location of an antenna can be marked using an active device, such as a light (e.g., an LED). Such markings can facilitate placement of communication device 110 and/or placement of power tool 102 such that antennas associated with power tool 102 and communication device 110 can reliably be brought into appropriate proximity and/or alignment.

In some embodiments, communication system(s) 308 can include any suitable hardware, firmware, and/or software for communicating information over communication network 108 and/or any other suitable communication networks. For example, communication systems 308 can include one or more transceivers, one or more antennas (e.g., antenna 114), one or more communication chips and/or chip sets, etc. In a more particular example, communication systems 308 can include hardware, firmware, and/or software that can be used to establish Bluetooth connection, a Wi-Fi connection, a cellular connection, an NFC connection, an RFID connection, a UWB connection, an Ethernet connection, etc.

In some embodiments, memory 310 can include any suitable storage device or devices that can be used to store instructions, values, etc., that can be used, for example, by processor 302 to communicate with one or more power tools 102 via communication system(s) 308, to communicate with one or more computing device 104 via communication system(s) 308, to communicate with one or more servers 106 via communication system(s) 308, etc. Memory 310 can include any suitable volatile memory, non-volatile memory, storage, or any suitable combination thereof. For example, memory 310 can include RAM, ROM, EEPROM, one or more flash drives, one or more hard disks, one or more solid state drives, one or more optical drives, etc. In some embodiments, memory 310 can have encoded thereon a computer program for controlling operation of communication device 110. In such embodiments, processor 302 can execute at least a portion of the computer program to establish a wireless communication link with another device (e.g., power tool 102, computing device 104), transmit data (e.g., information and/or instructions) to power tool 102, receive data from power tool 102, transmit data to server 106, receive data from server 106, etc.

In some embodiments, power source interface 312 can be configured to selectively receive and/or electrically couple to a power source. For example, power source interface 312 can mechanically receive and/or couple to a battery. As another example, power source interface 312 can mechanically receive and/or couple to a cable (e.g., including a power line) configured to provide power from a power source, such as a battery (e.g., a battery integrated into communication device 110, a stored battery pack useable with a power tool 102), an AC wall outlet, a DC outlet (e.g., a universal serial bus (USB) port), etc. As yet another example, power source interface 312 can be configured to receive wireless power from a wireless power source (e.g., via inductive coupling). In some embodiments, power source interface 312 can also electrically couple one or more components of communication device 110 to the power source (e.g., processor 302, communication system 308, etc.) to provide power and/or communications between a power source and one or more other components of communication device 110. In some embodiments, power can be provided to power tool 102 from the power source via communication system 308. In some embodiments, a power source can be integrated into another device, such as a power tool (e.g., a radio, a vacuum, a work light(s)) stored in a storage system (e.g., a PACKOUT storage system). In some embodiments, communication device 110 can include one or more outlets (e.g., AC outlets, DC outlets, etc.) that can be used to provide power to another device (e.g., a battery charger, a power tool, a battery pack, etc.).

In some embodiments, communication device 110 can be associated with one or more components that can facilitate positioning of a tool (e.g., power tool 102). For example, communication device 110 can be associated with one or more appropriately positioned magnets (not shown) that can magnetically couple with a component(s) of a tool (e.g., a magnet, a component comprising a ferrous material, etc.) to cause the component(s) of the tool to be biased toward the location of the one or more magnets. For example, the one or more magnets can be integrated into a mat (e.g., a mat described below in connection with FIG. 6C), a toolbox, a storage system, etc.

In some embodiments, communication device 110 can be configured to have a form factor that can be placed into an aperture (e.g. a slot, hole, gap, window, etc.) of a component associated with storage of a tool (i.e., a component of a tool storage system). For example, a tool box (e.g., tool box 112) can be configured with one or more apertures for receiving communication device 110 and/or components of communication device 110 (e.g., toolbox can include an aperture for receiving a housing of communication device 110 and one or more apertures for receiving an antenna associated with communication device 110). As another example, a mat (e.g., a mat described below in connection with FIG. 6C) can be configured with one or more apertures for receiving communication device 110 and/or components of communication device 110. As yet another example, a rack and/or storage system (e.g., configured to store one or more tools and/or tool boxes) can be configured with one or more apertures for receiving communication device 110 and/or components of communication device 110. As still another, an insert for a tool box (e.g., a foam insert) can be configured with one or more apertures for receiving communication device 110 and/or components of communication device 110. In some embodiments, configuring communication device 110 to be modular (e.g., by configuring communication device 110 to have a form factor that can be placed into an aperture of a component associated with storage of a tool), can facilitate flexible use of communication device 110 and/or customization of tool storage.

Figure 3B:
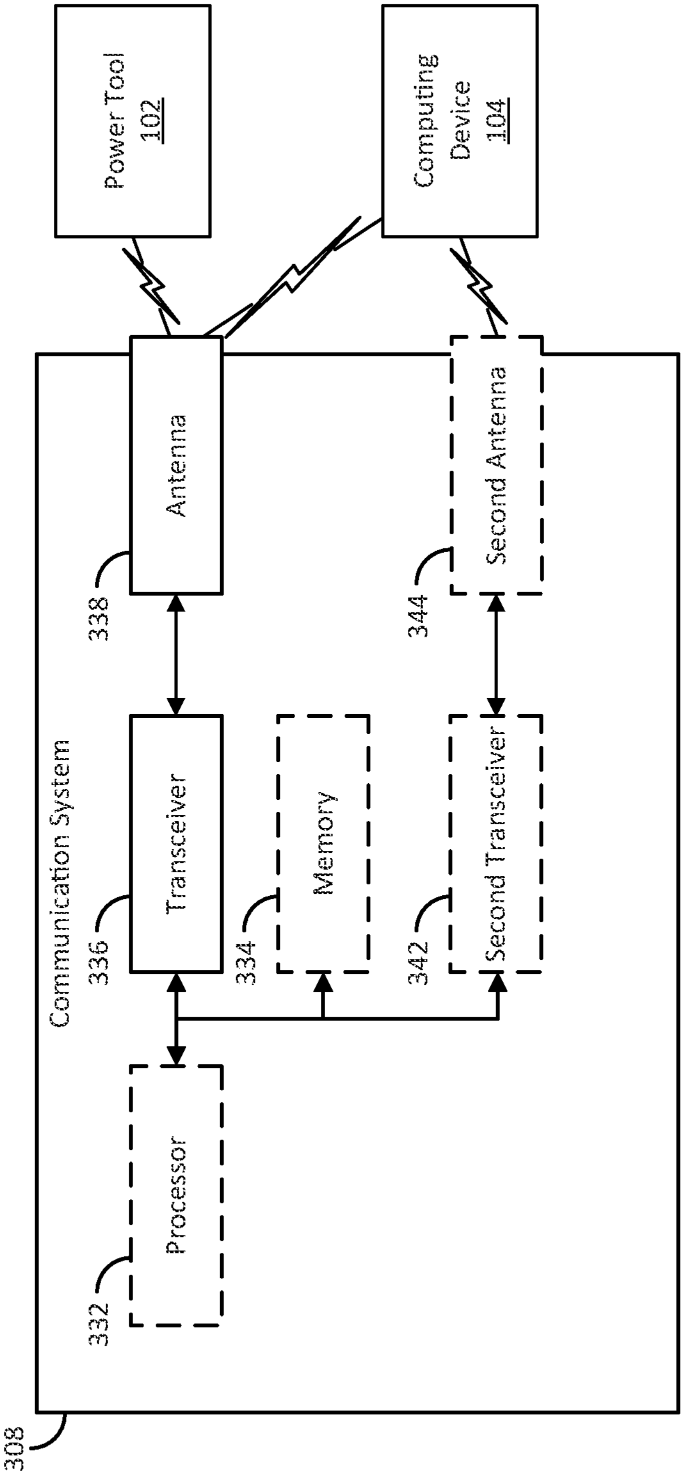
FIG. 3B is a schematic illustration of a wireless communication system in accordance with some embodiments of the disclosed subject matter.

FIG. 3B is a schematic illustration of communication system 308 in accordance with some embodiments of the disclosed subject matter. In some embodiments, communication system 308 can include a processor 332, memory 334, a transceiver 336, and an associated antenna 338 (the antenna 338 may represent the antenna 114 of FIG. 1). In some embodiments, processor 332 can be any suitable hardware processor or combination of processors, such as a CPU, a GPU, an ASIC, an FPGA, etc. In some embodiments, processor 332 can be omitted. For example, processor 302 of communication device 110 can control operations of communication system(s) in addition to, or in lieu of, processor 332.

In some embodiments, memory 334 can include any suitable storage device or devices that can be used to store instructions, values, etc., that can be used, for example, by processor 332 to control operation of communication system 308, to communicate with one or more devices (e.g., power tool 102, computing device 104), etc. Memory 334 can include any suitable volatile memory, non-volatile memory, storage, or any suitable combination thereof. For example, memory 334 can include RAM, ROM, EEPROM, one or more flash drives, etc. In some embodiments, memory 334 can have encoded thereon a program for controlling operation of communication system 308. In such embodiments, processor 332 can execute at least a portion of the program to establish a wireless communication link with a computing device (e.g., communication device 110, computing device 104), receive data and/or instructions (e.g., from communication device 110, from computing device 104, from server 106), provide data to controller 202, receive data from controller 202, store data (e.g., tool operation data) using memory 234 for later transmission (e.g., when power tool 102 is stored and/or lacks power from main power source 216), transmit data to a computing device (e.g., communication device 110, computing device 104), etc. In some embodiments, memory 334 can be omitted. For example, memory 310 of communication device 110 can perform functions described above in connection with memory 334 in addition to, or in lieu of, memory 334.

In some embodiments, transceiver 336 and antenna 338 can include a transceiver and antenna configured to transmit and/or receive data using any suitable communication protocol(s). For example, transceiver 336 and antenna 338 can include a transceiver and antenna configured to communicate using protocols associated with NFC, RFID, and/or any other suitable technology and/or protocol (e.g., as described above in connection with transceiver and antenna 236). In some embodiments, transceiver 336 and/or antenna 338 can be configured to transmit and/or receive data using a combination of communication protocols. For example, in some embodiments, transceiver 336 and/or antenna 338 can be configured to communicate using protocols associated with Bluetooth. As another example, transceiver 336 and/or antenna 338 can be configured to communicate using protocols associated with Wi-Fi. As yet another example, transceiver 336 and/or antenna 338 can be configured to communicate using protocols associated with Zigbee. As still another example, transceiver 336 and/or antenna 338 can be configured to communicate using protocols associated with UWB. As a further example, transceiver 336 and/or antenna 338 can be configured to communicate using protocols associated with a cellular standard (e.g., using a 3G network, a 4G network, a 5G network, etc., complying with any suitable standard, such as CDMA, GSM, LTE, LTE Advanced, NR, etc.). In some embodiments, communication system 308 can communicate using multiple different protocols and/or technologies. Additionally, in some embodiments, the communication system 308 may include multiple communication systems, each configured to communicate using different communication protocols and/or technologies, and/or communication device 110 can include multiple transceivers and/or antennas. For example, one communication system (e.g., configured to communicate via Bluetooth, cellular, Wi-Fi, etc.) can be used to communicate with a computing device and/or server, and another communication system (e.g., configured to communicate viaNFC) can be used to communicate with a power tool (e.g., power tool 102).

In some embodiments, communication system 308 can include multiple antennas 338, which can be disposed at multiple locations to increase the amount of tool box 112 that is within range of an antenna 338. For example, multiple antennas can be arranged in a grid pattern or another pattern within tool box 112. In some embodiments, where the tool box 112 may be form fitting to one or more particular tools 102 or may have particular areas or sections intended to receive power tools 102, antenna(s) 338 may be positioned in tool box 112 at or near those particular areas or sections intended to receive power tool(s) 102.

In some embodiments, communication system 308 can include one or more additional transceivers and/or antennas, such as second transceiver 342 and second antenna 344. In some embodiments, second transceiver 342 and/or second antenna 344 can be configured to transmit and/or receive data using any suitable communication protocol(s) (e.g., Bluetooth, Wi-Fi, Zigbee, UWB, cellular, etc.). In some embodiments, second transceiver 342 and second antenna 344 can be used to communicate with an external device, such as a computing device and/or server (e.g., via communication network 108), and transceiver 336 and/or antenna 338 can be configured to communicate with a stored power tool (e.g., power tool 102 disposed within tool box 112). In some embodiments, second transceiver 342 and/or second antenna 344 can be omitted. For example, in some embodiments, transceiver 336 and/or antenna 338 can be configured to communicate using multiple different communication protocols.

Figure 4:
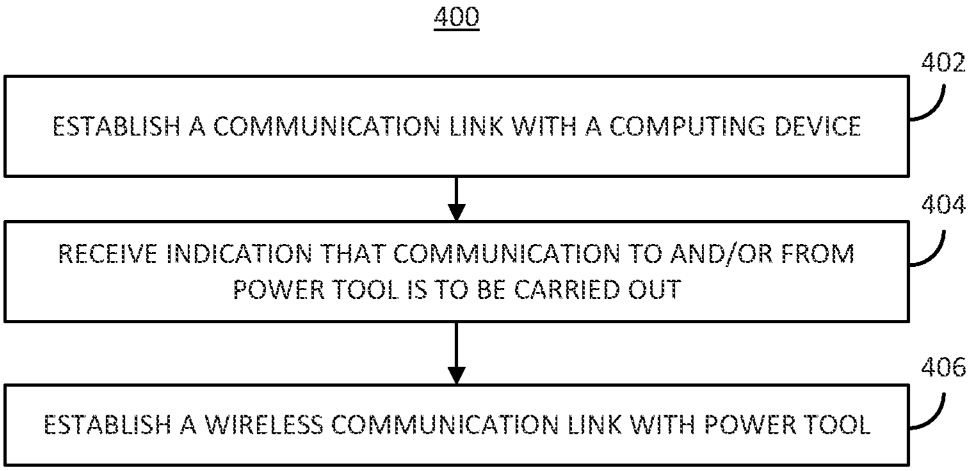
FIG. 4 is a flowchart of a process for wireless communication with a stored tool in accordance with some embodiments of the disclosed subject matter.

FIG. 4 is a flowchart of a process 400 for wireless communication with a stored tool in accordance with some embodiments of the disclosed subject matter. Process 400 is described below as being carried out by system 100. However, in some embodiments, the process 400 can be implemented by any other suitable system having additional, fewer, and/or alternative components. Additionally, although the blocks of process 400 are illustrated in a particular order, in some embodiments, one or more of the blocks can be executed partially or entirely in parallel, can be executed in a different order than illustrated in FIG. 4, or can be bypassed or otherwise omitted.

At block 402, communication device 110 (e.g., via communication system 308) can establish a communication link with an external device (e.g., computing device 104 or server 106). In some embodiments, the communication link established at block 402 can be any suitable communication link. For example, the link can be a Bluetooth link. As another example, the link can be a Bluetooth Low Energy (BLE) link. As yet another example, the link can be a Wi-Fi link (e.g., a direct Wi-Fi link with computing device 104, an indirect link via communication network 108, etc.). As still another example, the link can be a UWB link. As a further example, the link can be a wired link (e.g., a universal serial bus link). As another further example, the link can be a cellular link (e.g., a direct cellular link, such as a sidelink cellular link with computing device 104, an indicated link via communication network 108, etc.). As still another further example, the link can be an NFC link.

In some embodiments, communication device 110 can use any suitable technique or combination of techniques to establish the link. For example, computing device 104 can transmit a message requesting that devices within range respond with identifying information. In such an example, communication device 110 can respond to the message (e.g., with the requested identifying information of the communication device 110), and a wireless connection can be established.

At block 404, communication device 110 can receive a signal from the external device that indicates that communication to and/or from power tool 102 is to be carried out. In some embodiments, the signal can include an explicit instruction indicating that communication with a power tool (e.g., a particular power tool 102 or any power tool 102) is to be initiated and/or carried out. Additionally or alternatively, in some embodiments, the signal can include an implicit indication that communication to and/or from power tool 102 is to be carried out. For example, computing device 104 can transmit an instruction directed to power tool 102, and communication device 110 can determine that the instruction for power tool 102 is an indication that communication with power tool 102 is to be carried out. As another example, computing device 104 can establish an active communication link with communication device 110, and communication device 110 can determine that the active communication link is an indication that communication with power tool 102 is to be carried out.

In some examples, if power tool 102 is in a low power state, regardless of whether main power source 216 is capable of providing power to controller 202, power to controller 202 may be inhibited or unavailable from main power source 216 and/or an alternate power source (e.g., a coin cell battery). In such an example, communication device 110 can indicate a most recent power status of power tool 102 to computing device 104. Based on receipt of the power status (e.g., indicating a low power state of the power tool 102), computing device 104 may provide the explicit or implicit signal to initiate communication with power tool 102.

At block 406, communication device 110 (e.g., via communication system 308) can establish a wireless link with a power tool (e.g., power tool 102). In some embodiments, the wireless communication link established at 406 can be a relatively short range wireless communication link. For example, the link can be an NFC link (e.g., which can provide power to one or more components of power tool 102, such as communication system 220, controller 202, etc.). As another example, the link can be an RFID link (e.g., which can provide power to one or more components of power tool 102, such as communication system 220, controller 202, etc.). As yet another example, the link can be another suitable link (e.g., an RF link, such as a Bluetooth-based link or UWB-based link, a light-based link, a sound-based link, etc.). In such an example, the link may not provide power to any components of power tool 102.

In some embodiments, communication device 110 can use any suitable technique or combination of techniques to establish the link. For example, communication device 110 can transmit a message requesting that devices within range respond (e.g., with identifying information). In such an example, power tool 102 can respond to the message, and a wireless connection can be established (e.g., via an NFC link). As another example, communication device 110 can transmit power wirelessly (e.g., via antenna 338) to an antenna of power tool 102 (e.g., of transceiver and antenna 236). The transmitted power may wake-up or activate one or more components of the power tool 102 (e.g., the communication system 220, the controller 202, or components thereof). This transmitted power may serve as an implicit message requesting that the power tool 102 respond (e.g., with identifying information), and/or the communication device 110 may transmit an explicit message with such a request. In such an example, power tool 102 can respond to the (implicit or explicit) message, and a wireless connection can be established (e.g., via an NFC link).

In some embodiments, subsequent to the communication link being established at 406, communication device 110 can transmit to, and/or receive from, power tool 102 any suitable data and/or instructions (e.g., as described below in connection with block 510 of FIG. 5). For example, communication device 110 can cause power tool 102 to provide tool operation data (e.g., stored in memory 310 and/or memory 334) to communication device 110, which can transmit such data to the external device. As another example, communication device 110 can cause power tool 102 to provide tool identifying data (e.g., stored in memory 310 and/or memory 334) to communication device 110, which can transmit such data to the external device.

In some embodiments communication device 110 can periodically (e.g., at regular and/or irregular intervals) attempt to establish a communication link with a power tool regardless of whether a signal has been received from an external device (e.g., bypassing block 404 or blocks 402 and 404 of the process 400). For example, after a predetermined period of time has elapsed since a last communication link was established with power tool 102 and/or a last attempt to establish a communication link with power tool 102, communication device 110 can attempt to establish a communication link with one or more power tools which may be within range of communication system 308. As another example, communication device 110 can attempt to establish a communication link with a power tool in response to communication device 110 receiving power (e.g., when communication device 110 is connected to a power source). As yet another example, communication device 110 can attempt to establish a communication link with a power tool in response to communication device 110 determining that a tool box has been opened or closed (e.g., via a sensor associated with tool box 112), and/or in response to communication device 110 determining that an object has been disposed within tool box 112 (e.g., based on one or more occupancy sensors, such as a weight sensor configured to sense when an object is disposed within tool box 112).

Figure 5:
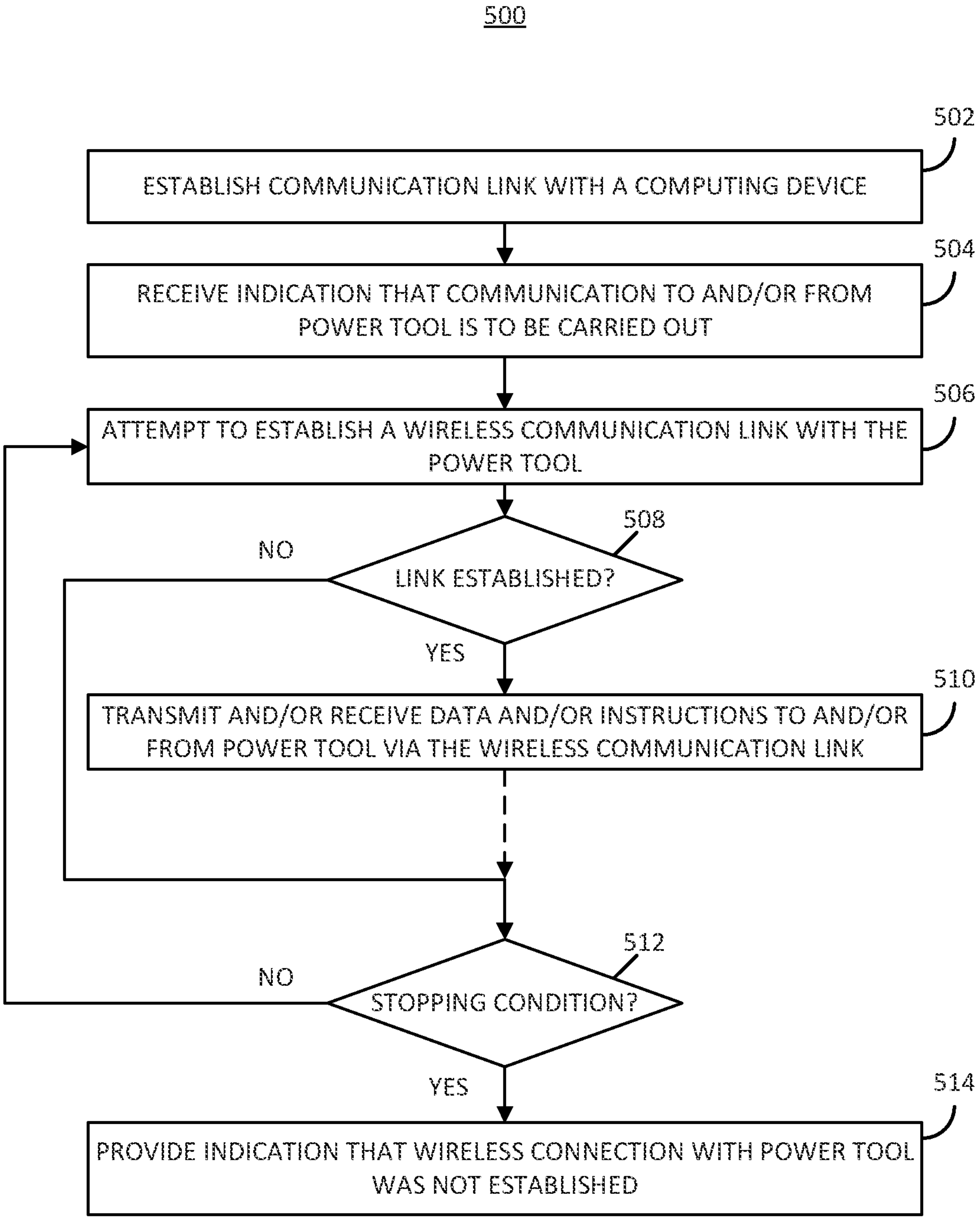
FIG. 5 is a flowchart of another process for wireless communication with a stored power tool in accordance with some embodiments of the disclosed subject matter.

FIG. 5 is a flowchart of another process 500 for wireless communication with a stored power tool in accordance with some embodiments of the disclosed subject matter. Process 500 is described below as being carried out by system 100. However, in some embodiments, process 500 can be implemented by any other suitable system having additional, fewer, and/or alternative components. Additionally, although the blocks of process 500 are illustrated in a particular order, in some embodiments, one or more of the blocks can be executed partially or entirely in parallel, can be executed in a different order than illustrated in FIG. 5, or can be bypassed or otherwise omitted.

At block 502, communication device 110 (e.g., via communication system 308) can establish a communication link with an external device (e.g., computing device 104, server 106). In some embodiments, the communication link established at block 502 can be any suitable communication link, and can be established using any suitable technique or combination of techniques. For example, the communication link can be a communication link described above in connection with block 402 of process 400, and can be established as described above in connection with block 402.

At block 504, communication device 110 can receive a signal from the external device that indicates that communication to and/or from power tool 102 is to be carried out. In some embodiments, the indication received at 504 can be any suitable indication, and can be received using any suitable technique or combination of techniques. For example, the indication can be an indication described above in connection with block 404 of process 400.

At block 506, communication device 110 (e.g., via communication system 308) can attempt to establish a wireless link with one or more power tools (e.g., power tool 102). In some embodiments, communication device 110 can attempt to establish the wireless link with one or more power tools using any suitable technique or combination of techniques. For example, communication device 110 can transmit a message requesting that devices within range respond, and any compatible power tool within range can respond (e.g., via communication system 220). The response may include identifying information identifying the responding device, as well as other information that the communication device 110 may use to establish and communicate using the wireless link (e.g., a communication channel, frequency, or protocol to use for the wireless link).

At block 508, communication device 110 can determine whether a link to one or more power tools has been established. If communication device 110 determines that a link has been established ("YES" at 508), communication device 110 can move to block 510. Otherwise, if communication device 110 determines that a link has not been established ("NO" at 508), communication device 110 can move to block 512.

At block 510, communication device 110 can communicate data and/or instructions with the power tool(s) with which a communication link has been established. For example, communication device 110 can transmit data and/or instructions to a power tool (e.g., power tool 102), and/or can receive data and/or instruction from the power tool.

In some embodiments, communication device 110 (e.g., via communication system 308) can communicate any suitable data with power tool 102, computing device 104, and/or server 106. For example, communication device 110 can communicate information to power tool 102 (e.g., and/or any other suitable device), and/or receive information from power tool 102. In a more particular example, communication device 110 can receive from power tool 102 one or more of status information (e.g., including a power status, a security status, etc.) associated with power tool 102, tool operation data (e.g., operation statistics) associated with power tool 102, identification information associated with power tool 102, power tool usage information associated with power tool 102, power tool maintenance data associated with power tool 102, etc. As another example, communication device 110 can receive from computing device 104 information that can facilitate additionally functionality and/or services associated with power tool 102 (e.g., enabling one or more features and/or services), that can provide updated software (e.g., an updated application to computing device 104, updated software and/or firmware for power tool 102, etc.), and/or any other suitable functions. In such an example, communication device 110 can provide such information to power tool 102, and/or provide instructions to carry out operations to facilitate additional functionality and/or services. In some embodiments, data communicated from power tool 102 (or any other device associated with communication system 220) can include any suitable data. For example, if communication system 220 is electrically coupled to controller 202 and configured to retrieve and/or store tool operation data, power tool 102 can transmit tool operation data. As another example, if communication system 220 is not electrically coupled to a tool controller (e.g., tool controller 202), communication system 220 can transmit data stored in memory 234, such as tool identifying information (and/or previously stored tool operational data received from the tool controller 202).

In some embodiments, during and/or after communications with a power tool have been carried out at 510, communication device 110 can attempt to establish a communication link with one or more other power tools in range of communication system 308 (e.g., via NFC). For example, multiple tools may be disposed within a tool box, and communication device 110 can attempt to establish a connection with one or more other power tools (e.g., via a different antenna disposed in a different location than the antenna used to connection to a power tool at 506). In some embodiments, the communication device 110 may establish multiple parallel connections, each with a respective power tool disposed in the tool box, and then proceed to communicate with the respective tools as described with respect to block 510. In some embodiments, the communication device 110 may sequentially pair with one power tool at a time and communicate with each respective power tool disposed in the tool box, one at a time (e.g., cycling through blocks 506, 508, 510, and 512 until achieving communication with each power tool). In some embodiments, after establishing a communication link with one power tool at 506, communication device 110 can cease attempts to establish communications with one or more other power tools (e.g., movement from block 510 to block 512 can be omitted).

Otherwise, if a link has not been established with a power tool at 508, at block 512, communication device 110 can determine whether a stopping condition has been reached (e.g., a predetermined criterion, predetermined criteria, and/or predetermined threshold has been satisfied. For example, communication device 110 can determine whether a predetermined number of attempts (e.g., N attempts) to establish a communication link with a power tool (e.g., via one or more antennas, such as antenna 338) have been carried out. As another example, communication device 110 can determine whether a predetermined time to establish a communication link with a power tool (e.g., via one or more antennas, such as antenna 338) has elapsed (e.g., since a first attempt to establish communication was). As yet another example, communication device 110 can determine whether a received signal strength (e.g., quantified as a received signal strength indicator) fails to satisfy a threshold (e.g., a threshold decibel (dB) level). As yet another example, communication device 110 can determine whether a wireless link has been established with a predetermined number of power tools, with each power tool within communication range, or with each power tool in an associated tool box (e.g., within a certain time frame). If communication device 110 determines that a stopping condition has not been reached ("NO" at 512), communication device 110 can return to block 506, and can attempt to establish a communication link again. Otherwise, if communication device 110 determines that a stopping condition has been reached ("YES" at 512), communication device 110 can move to 514. In some embodiments, one or more stopping conditions can vary based on one or more conditions (e.g., time of day, a time since a last connection was established, a number of connections established within a predetermined period of time, such as in a last 8 hours, 10 hours, 16 hours, 24 hours, etc.). For example, a timeout, number of attempts, etc., can be reduced during certain times of day (e.g., at night).

At block 514, communication device 110 can provide an indication to the external device that a wireless connection with a power tool was not established.

In some embodiments, the communication device 110 performs another process for wireless communication with a stored power tool. For example, the communication device 110 may determine to establish a wireless communication link with a power tool (e.g., power tool 102) in the tool box 112 associated with the communication device 110. Such determination may be in response to a signal from an external device (e.g., computing device 104 or server 106), may be in response to an indication that power tool 102 is present in the tool box 112, and/or may be in response to elapsing of a predetermined amount of time, and/or may be in response to another triggering event (e.g., closing a lid of the tool box 112, pressing a button on the tool box 112 that provides an indication to the communication device 110, etc.).

After determining to establish the wireless communication link with power tool 102, communication device 110 establishes the wireless communication link. Communication device 110 may establish the wireless communication link with the power tool 102 using similar techniques as described above with respect to block 406 of FIG. 4.

After establishing the wireless communication link with the power tool 102, communication device 110 may communicate with power tool 102 to transmit and/or receive data and/or instructions via the link (e.g., as described above with respect to block 510 of FIG. 5). In some embodiments, the communication device 110 may further store and/or communicate data and/or instructions received from power tool 102 to an external device (e.g., computing device 104 or server 106). In some embodiments, communication device 110 and/or power tool 102 can be configured to provide feedback (e.g., visual, audible, tactile, electronic, etc.) to indicate that a connection has been established (e.g., in this process and/or in block 510) using any suitable indication. For example, a light (e.g., an LED) associated with communication system 220 and/or communication system 308 can be powered (e.g., once, continuously, or intermittently) when a connection has been established (e.g., for a predetermined period of time, while the connection is established, etc.). As another example, an audio device (e.g., a speaker) can be actuated (e.g., to generate a sound, such as a tone, a combination of tones, a sequence of tones, etc.) when a connection has been established. As yet another example, an electrical and/or mechanical device (e.g., an eccentric rotating mass actuator, a motor, etc.) can be actuated when a connection has been established. As still another example, an external device (e.g., computing device 104) can receive a signal (e.g., an electronic signal) indicating that a connection has been established, and the external device can provide feedback to a user (e.g., via a notification, a sound, tactile feedback, etc.). Alternatively, in some embodiments, communication device 110 and/or power tool 102 can be configured to not provide an explicit indication that a connection has been established.

FIGS. 6A and 6B illustrate a tool box 600. Tool box 600 can be an example of tool box 112, according to some embodiments. Tool box 600 can include a base 605 with walls 602 and a floor 603 defining a volume for receiving one or more power tools 102. Tool box 600 can further include a lid 610 that can be hinged at a first end and that can latch when pivoted to close the volume defined by base 605. In other examples, the lid 610 may be removable from the base 605 (e.g., not hinged). Tool box 600 can further include communication device 110, e.g., integrated into base 605 (as shown in FIG. 6A), integrated into lid 610, or otherwise supported by tool box 600. Accordingly, tool box 600 can support the power source interface, the transceiver, the antenna, and the processor.

As shown in FIG. 6B, tool box 600 can include a set of antennas 114 distributed on the floor of base 605 and/or on lid 610. As previously described, antennas 114 can be integrated into lid 610 or secured thereto, integrated into base 605 (e.g., the floor 603) or secured thereto, or integrated into or on a mat that is inserted into or attached to tool box 600. Communication device 110 (e.g., via processor 302) can be configured to communicate with power tool 102 using each of the plurality of antennas 114 (e.g., one at a time). Although configured to use each of the plurality of antennas 114, in some examples, communication device 110 can communicate with power tool 102 using a nearest antenna of antennas 114. Thus, if an antenna (e.g., antenna 116) associated with power tool 102 is near a first antenna of antennas 114, processor 302 can communicate with power tool 102 using the first antenna, whereas if an antenna associated with power tool 102 is near a second antenna of antennas 114, processor 302 may communicate with power tool using the second antenna. Additionally, processor 302 can communicate with multiple power tools 102 using respective antennas of antennas 114. For example, processor 302 can communicate with a first power tool 102 using a first antenna 114, and can communicate with a second power tool 102 using a second antenna 114.

In some embodiments, tool box 600 can have a different size, shape, quantity of antennas 114, location of antennas 114, and/or pattern of antennas 114 than illustrated in FIGS. 6A and 6B. The tool box 600, like tool box 112, is an example of a tool storage system. As noted above, the communication device 110 may be integrated into various types of tool storage systems and, accordingly, these various types of tool storage systems may execute processes 400 and 500.

Figure 6D:
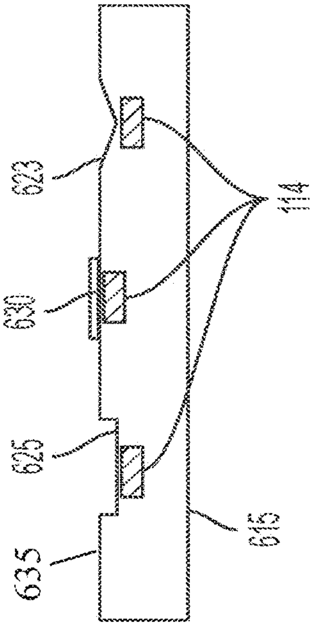
FIG. 6D illustrates a cross sectional view of the mat of FIG. 6C in accordance with some embodiments of the disclosed subject matter.
Figure 6C:
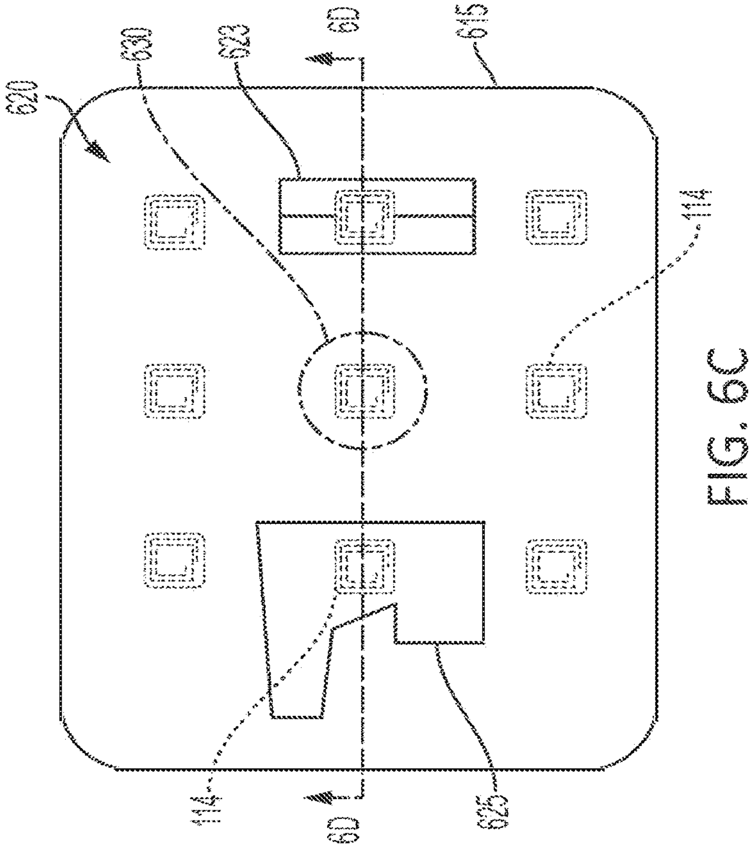
FIG. 6C illustrates a mat having antennas for wireless communicating with a stored power tool in accordance with some embodiments of the disclosed subject matter.

In some embodiments, antennas 114 can be integrated into a mat 615, such as shown in FIGS. 6C and 6D, that is supported by tool box 600. Antennas 114 can be arranged in a grid pattern 620. In FIG. 6C, the mat 615 includes nine antennas 114, two of which are particularly labeled. The mat 615 may be integrated into the tool box 600. For example, mat 615 can be inserted into tool box 600 and can rest on (and be supported by) the floor of base 605. The mat 615 may be secured to the floor 603 (e.g., through adhesive or fastening devices) or may be unsecured (e.g., and held in position by gravity). In other examples, mat 615 can be integrated into a wall 602, floor 603, or lid 610 of tool box 600. The particular quantity of antennas and pattern in FIG. 6C is merely an example, and may be different in other embodiments. For example, the antenna 114 may be arranged in a non-regular pattern in which each antenna corresponds to a designated tool reception location on the mat 615 (e.g., indicated by a visual marking, groove, aperture, or the like on the mat 615). In other examples, the antennas 114 are arranged in a regular, non-grid pattern, such as a staggered pattern. As described above, in some embodiments, antennas 114 can be used to establish a communication link and/or power link with a stored tool. In some examples, the mat 615 is inserted into (and supported by) a different tool box (e.g., of a different size and/or shape) or tool storage system. The mat 615 is an example of a tool box insert. In another example, the communication device is integrated into a foam insert, another type of tool box insert, that may be inserted into tool box 600 or another tool storage system.

In some embodiments, mat 615 can be configured to have any suitable form factor and/or can be disposed on any suitable surface. For example, with reference to FIGS. 6C and 6D, at least a portion of mat 615 can be configured to form a groove 623 (e.g., a V-shaped groove, a U-shaped groove, etc.) that can support and/or position a tool(s) to be in proximity to one or more antennas 114. In such an example, tools with a particular shape (e.g., batteries) can be supported by the groove, such that an antenna of the tool (e.g., antenna 116) is supported in proximity to an antenna of mat 615. As another example, at least a portion of mat 615 can be configured to form an aperture(s) configured to support a tool(s) with a particular shape. In such an example, the aperture can have a shape that is similar to an exterior shape of a particular tool. For example, the mat 615 includes an aperture 625 shaped like a power drill-driver. As described above in connection with FIG. 3, in some embodiments, mat 615 can include a marking(s) indicating a location(s) of one or more antennas 114. See, for example, marking 630 of FIG. 6C outlining one of antennas 114. Although only one marking 630 is illustrated, each antenna 114 may have a corresponding marking similar to marking 630. Further, marking 630 is merely an example visual marking, and the particular configuration or look of marking 630 may take other forms in other embodiments. As shown in FIG. 6D, the antennas 614 may be recessed below a surface 635 of the mat 615.

It is to be understood that the disclosure is not limited in its application to the details of construction and the arrangement of components set forth in the description provided herein or illustrated in the associated drawings. The disclosure is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings. Further, “connected” and “coupled” are not restricted to physical or mechanical connections or couplings.

As used herein, unless otherwise limited or defined, discussion of particular directions is provided by example only, with regard to particular embodiments or relevant illustrations. For example, discussion of “top,” “front,” or “back” features is generally intended as a description only of the orientation of such features relative to a reference frame of a particular example or illustration. Correspondingly, for example, a “top” feature may sometimes be disposed below a “bottom” feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, etc.), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, etc., consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is “configured” in a certain way is configured in at least that way, but may also be configured in ways that are not listed.

The term “article of manufacture” as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, flash memory devices (e.g., card, stick, etc.), and other solid state memory (e.g., RAM, ROM, EEPROM, etc.). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms “component,” “system,” “module,” and the like are intended to encompass part or all of computer-related systems that include hardware, software, firmware, a combination of hardware and software/firmware, software, or firmware, in execution. For example, a component may be, but is not limited to being, a processor device, a process being executed (or executable) by a processor device, an object, an executable, a thread of execution, a computer program, or a computer. By way of illustration, both an application running on a computing device and the computing device can be a component. One or more components (or system, module, etc.) may reside within a process or thread of execution, may be localized on one computing devices, may be distributed between two or more computing devices or other processor devices, or may be included within another component (or system, module, etc.).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as “first,” “second,” etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase “and/or” used with two or more items is intended to cover the items individually and the items together. For example, a device having “a and/or b” is intended to cover: a device having a (but not b); a device having b (but not a); and a device having both a and b.

This description is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown and described herein, but are to be accorded the widest scope consistent with the principles and features disclosed herein and the claims below. The preceding detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A system for wirelessly communicating with a tool, the system comprising:
- a tool storage system configured to store the tool;
- a wireless communication device coupled to the tool storage system, the wireless communication device comprising:
  - a power source interface configured to selectively electrically couple to a power source;
  - a transceiver;
  - an antenna wherein the antenna inductively couples to an antenna electrically coupled to the tool such that the system provides power to the tool;
  - a processor electrically coupled to the power source, the transceiver, and the antenna, wherein the wireless communication device is configured to:
    - establish a first communication link with an external device;
    - receive an indication that communications with the tool are to be carried out; and
    - in response to the indication that communications with the tool are to be carried out, establish a wireless second communication link with the tool using the transceiver and antenna.

2. The system of claim 1, wherein the tool storage system comprises:
- a tool box including a base defining a volume and a lid, wherein the tool box supports the power source interface, the transceiver, the antenna, and the processor.

3. The system of claim 2, wherein the antenna is one of a plurality of antennas arranged into a pattern in the tool box, and wherein the wireless communication device is configured to communicate with the tool using each of the plurality of antennas.

4. The system of claim 3, wherein the plurality of antennas are integrated into a mat that is supported by the tool box within the volume.

5. The system of claim 2, wherein the antenna is one of a plurality of antennas arranged into a pattern in the tool box, and wherein the wireless communication device is configured to establish the wireless second communication link with the tool using a first antenna of the plurality of antennas and is configured to establish a wireless third communication link with another tool stored in the tool box using a second antenna of the plurality of antennas.

6. The system of claim 1, wherein the second communication link comprises a near-field communication (NFC) link.

7. The system of claim 1, wherein the first communication link comprises a Bluetooth link, a Wi-Fi link, or a cellular link.

8. The system of claim 1, wherein the wireless communication device is further configured to establish the first communication link using the antenna.

9. The system of claim 1, wherein the wireless communication device is further configured to:

receive, via the second communication link using the transceiver and the antenna, data from the tool; and transmit, via the first communication link, the data to the external device.

10. The system of claim 9, wherein the data comprises tool operation data associated with the tool.

11. The system of claim 1, wherein the wireless communication device is further configured to:

receive data, via the first communication link, from the external device; and transmit, via the second communication link using the transceiver and the antenna, the data to the tool.

12. The system of claim 11, wherein the data comprises a firmware update or software update to be installed by the tool.

13. The system of claim 1, wherein the power source comprises at least one selected from the group of a battery, a power line, the external device providing power wirelessly, or the tool providing power wirelessly.

14. The system of claim 1, wherein the tool comprises one or more of a motorized power tool, a non-motorized power tool, or a hand tool.

15. The system of claim 1, wherein the wireless communication device is further configured to:

establish a wireless third communication link with another tool using the transceiver and antenna.

16. The system of claim 1, wherein the power provided to the tool is used to charge a main power source of the tool.

17. The system of claim 1, wherein the power provided to the tool is used to charge an alternate power source of the tool.

18. A method for wirelessly communicating with a tool, comprising:

establishing, by a wireless communication device coupled to a tool storage system storing the tool, a first communication link with an external device;

receiving, by the wireless communication device, an indication that communications with the power tool are to be carried out;

in response to the indication that communications with the power tool are to be carried out, establishing, by the wireless communication device, a wireless second communication link with the power tool using a transceiver and antenna of the wireless communication device; and providing power, by the wireless communication device, to the tool via inductive coupling.

19. The method of claim 18, wherein the tool storage system comprises a tool box including a base defining a volume and a lid, the method further comprising:

receiving, in the volume by the tool box, the tool; and supporting, by the tool box, the wireless communication device.

20. The method of claim 19, wherein the antenna is one of a plurality of antennas arranged into a pattern in the tool box, and wherein the wireless communication device is configured to communicate with the tool using each of the plurality of antennas.

21. The method of claim 20, further comprising:

supporting, by the tool box within the volume, a mat that is integrated with the plurality of antennas.

22. The method of claim 19, wherein the antenna is a first antenna of a plurality of antennas, the method further comprising:

receiving, by the tool box, a second tool; and establishing, by the wireless communication device, a wireless third communication link with the second tool using a second antenna of the plurality of antennas.

23. The method of claim 18, further comprising:

inductively coupling, by the antenna, to an antenna electrically coupled to the tool; and providing power, by the wireless communication device, to the tool via the inductive coupling.

24. The method of claim 18, wherein power is provided to the tool with the transceiver and antenna, and wherein power is provided to a controller of the tool.

* * * * *